INVENTOR.
ROBERT C. MC LEESTER
BY
ATTORNEY 3,657,260
ELECTROPHORESIS APPARATUS
Robert C. McLeester, 1202 Pontiac Trail,
Madison, Wis. 53711
Filed Sept. 25, 1970, Ser. No. 75,366
Int. Cl. B01k 5/00
U.S. Cl. 204—299          5 Claims

ABSTRACT OF THE DISCLOSURE

An acrylic plastic unit having a upper buffer chamber with upright gel tubes permanently fixed in and extending through the bottom thereof and a pair of platinum wire electrodes fixedly secured equidistance between the rows of tubes. One of the electrodes is fixed in the upper chamber above the bottom thereof and the other below the bottom. A rubber covered stopper plate is releasably attached to the unit for simultaneously sealing the lower end of all of the gel tubes.

BACKGROUND OF THE INVENTION

This invention relates to apparatus for conducting electrophoresis and electrofocusing processes.

The difference between gel electrophoresis and gel electrofocusing should be noted. In the process of gel electrophoresis, proteins applied as a zone move continuously through the gel, and are fractionated in an electric field according to charge and by passage through the gel pores according to size. Spreading of zones due to diffusion continues throughout the process. In gel electrofocusing, the proteins are concentrated from the gel to the portion of the pH gradient at which each is isoelectric. The components then remain stationary as long as the pH remains unchanged and spreading due to diffusion is considerably reduced in electrofocusing. The gel in electrofocusing thus serves merely to stabilize the pH gradient and does not function as a molecular seive as in the gel electrophoresis process.

While my apparatus may be used for both electrophoresis and electrofocusing, the remainder of the discussion herein will be directed to its use in the electrophoresis process.

The electrophoresis apparatus which is presently produced by and available from several sources in the industry is generally designed along the concepts described by Davis. (Davis, B. J., 1964, Ann. N.Y. Academy of Science 121: 404–427) Such known apparatus typically comprises two buffer chambers with a number of gel tubes inserted in rubber grommets in the bottom of the upper chamber. The upper chamber is suspended over the lower chamber so that the bottoms of the tubes are submerged in the buffer. There is an electrode in each buffer chamber. Each tube is stopped individually before being filled with gel solution and a rack for holding the tubes vertical during polymerization is generally required. After polymerization, each of the tubes must be handled individually to remove the stoppers and placed into the rubber grommets in the upper chamber.

My invention unites the upper buffer chamber, a multiplicity of gel tubes arranged in two linear rows, and two electrodes into a single one-piece unit. This unique design assures vertical alignment of all of the gel tubes during both polymerization and electrophoresis and consequently assures horizontal band formation. It also eliminates the need for a separate rack for holding the tubes during polymerization. The two fixed rows of gel tubes with a linear wire electrode running between the rows in the upper buffer chamber and a second electrode running between them in a lower chamber formed by a buffer tank assures an equal voltage drop across each gel.

A rubber covered plate is attached to the unit to simultaneously seal the bottom of all the gel tubes during gel preparation.

Further objects, features and advantages of the invention will be apparent from the following detailed description tanen in conjunction with the accompanying drawings showing a preferred embodiment of the invention for exemplification.

DESCRIPTION OF A PREFERRED EMBODIMENT

Figures 1, 2, 3:
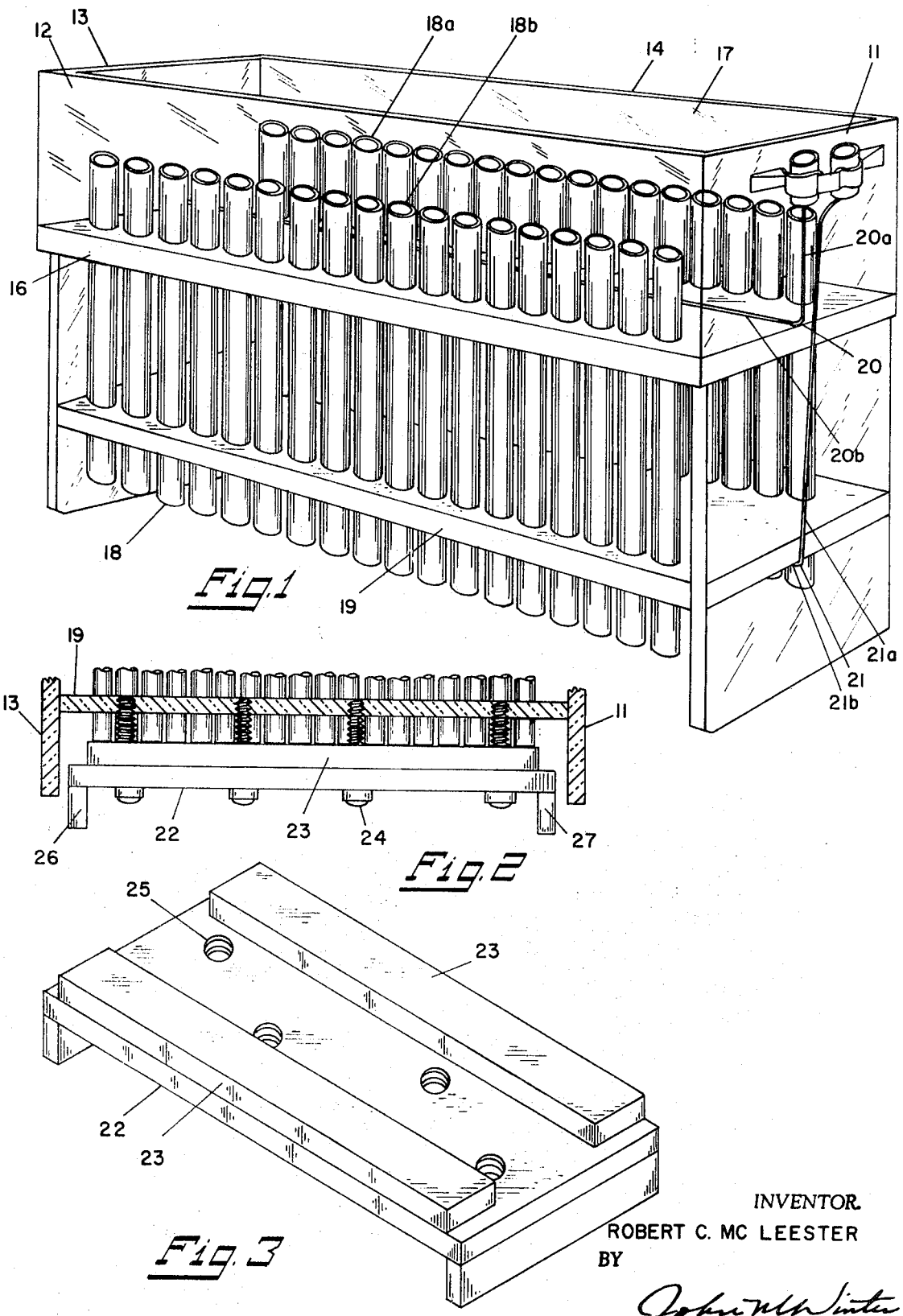
FIG. 1 is a frontal perspective view of apparatus comprising my invention.
FIG. 2 is a fragmentary section view of my apparatus showing the stopper plate in place.
FIG. 3 is a perspective view of the stopper plate.

Referring now more particularly to the drawings wherein like numerals refer to like parts throughout the several views, FIG. 1 shows a unit at 10 embodying my invention. The generally rectangular unit has upright side walls 11, 12, 13 and 14 and a bottom wall 6 extending between the side walls to form an open-topped, upper buffer chamber 17.

A multiplicity of vertically disposed, open-ended gel tubes 18 (thirty-six tubes shown arranged in two linear rows 18a and 8b of eighteen tubes each) are permanently fixed in and bonded to the bottom wall 16. The tubes 18 extend upwardly from the bottom wall into the upper buffer chamber and downwardly through the bottom wall in spaced parallel relation to one another.

Side walls 11 and 13 extend downwardly beyond the bottom 16 of the upper buffer chamber to a point below the lower end of the gel tubes. A substantially horizontal tube retaining base plate 19 extends between the side walls 11 and 13 at a level substantially below the bottom of the upper buffer chamber. The gel tubes 18 are fixedly attached to the base plate and extend downwardly therethrough.

This particular construction unifying the upper buffer chamber and the gel tubes by permanently fixing the tubes in the unit provides permanent vertical alignment of all the gel tubes during polymerization and electrophoresis when the unit is leveled, thus, assuring horizontal band formation in all tubes. Furthermore, the unit eliminates the need for the typical polymerization rack as well as time consuming individual handling of the gel tubes.

As best shown in FIG. 1, an upper platinum wire electrode 20 has a first portion 20a encased in acrylic plastic and extending through side wall 11 of the unit. A second portion 20b of the electrode thence extends horizontally through the upper buffer chamber between the rows of gel tubes 18a and 18b and being spaced equidistance from each of the tubes. The distal end of the horizontal portion of electrode 20 is affixed to the bottom wall 16 thereby permanently fixing the position of the electrode with respect to the gel tubes in the upper buffer chamber.

A lower electrode 21 also in the form of a platinum wire has a first portion 21a encased in acrylic plastic and extending downwardly along side wall 11 to a point below the base plate 19. The electrode 21 extends through the side wall 11 and thence horizontally at 21b along the bottom of the base plate between the rows of gel tubes. Similar to the horizontal portion of electrode 20, the horizontal portion 21b of electrode 21 is spaced equidistance from the tubes in each row. The distal end of horizontal electrode portion 21b is fixed in the base plate.

The forming of the electrodes, upper buffer chamber, and gel tubes into a single unit, thus permanently fixing their relative positions, assures a uniform voltage drop across the gel tubes that is not achieved with individually positioned tubes and electrodes.

A stopper plate as shown at 22 in FIGS. 2 and 3 extends across the lower ends of all of the gel tubes. A pair of rubber strips 23 form the top of the stopper plate and engage against and seal the lower ends of the gel tubes 18 when the stopper plate is fastened to the base plate 19 by four plastic screws 24 threaded into the bottom of the base plate as shown in FIG. 2. As seen in FIG. 3, the holes 25 in the stopper plate which receive the screws 24 are spaced transversely from the longitudinal center line of the rectangular stopper plate so that the sealing pressure on each row of tubes can be adjusted to prevent leakage of gel solutions during gel preparation and polymerization. The stopper plate has a pair of end legs 26 and 27 which extend downwardly below the lower edge of side walls 11 and 13 so that the unit rests on the legs of the stopper plate when the plate is attached to the unit.

After polymerization, the stopper plate 22 is removed and the unit is placed in a outer rectangular tank (not shown) providing a lower buffer chamber. When using large pore gels that might slip out of the tubes during electrophoresis, a plastic screen stopper (not shown) may be attached to support the gels after the rubber covered stopper plate 22 has been removed.

It should be understood that the present invention is not confined to the particular construction and arrangement of parts herein illustrated and described, but embraces all such modified forms thereof as may come within the scope of the following claims.

I claim:

1. In apparatus for performing electrophoresis and electrofocusing processes a unit comprising:
   (a) an upper buffer chamber having upright side walls and a substantially horizontal bottom wall extending between said side walls,
   (b) at least two rows of open-ended gel tubes permanently fixed in upright position in said bottom wall and extending downwardly therethrough in spaced parallel relation to one another, and
   (c) first and second electrodes each having a substantially horizontal portion in a permanently fixed position between said rows of tubes and being equally spaced from each of said rows, the horizontal portions of said electrodes being vertically spaced from one another above and below the bottom wall of said upper buffer chamber.

2. In apparatus for performing electrophoresis and electrofocusing processes, the unit as specified in claim 1 wherein at least two of said side walls extend downwardly below the bottom wall of said upper buffer chamber and below the lower end of said gel tubes, and having a tube retaining base plate extending between said side walls below said bottom wall, said tubes being fixedly attached to said base plate and extending downwardly therethrough, said first electrode extending in said upper buffer chamber along the top of said bottom wall and said second electrode extending along said base plate.

3. In apparatus for performing electrophoresis and electrofocusing processes, the unit as specified in claim 2 having a stopper plate of such a size and shape as to extend across the lower ends of all of said gel tubes, and fastening means for releaseably securing said stopper plate to said base plate whereby said stopper plate engages against the bottom end of said gel tubes to form a liquid-tight seal therewith.

4. In apparatus for performing electrophoresis and electrofocusing processes, the unit as specified in claim 3 wherein said fastening means comprises a plurality of screw members extending through holes in said stopper plate and being threaded into said base plate, at least two of said screw receiving holes being spaced transversely of the center line of said stopper plate.

5. In apparatus for performing electrophoresis and electrofocusing processes, the unit as specified in claim 3 wherein said stopper plate has a pair of legs extending downwardly below the lower end of said side walls when said stopper plate is fastened to said base plate.

References Cited

UNITED STATES PATENTS

| | | | |
|---|---|---|---|
| 3,384,564 | 5/1968 | Ornstein et al. | 204—299 X |
| 3,445,360 | 5/1969 | Via, Jr. | 204—180 G |
| 3,576,727 | 4/1971 | Evatt | 204—180 G |

JOHN H. MACK, Primary Examiner

A. C. PRESCOTT, Assistant Examiner

U.S. Cl. X.R.

204—180 G